(12) United States Patent
Gaudan et al.

(10) Patent No.: US 8,457,811 B2
(45) Date of Patent: Jun. 4, 2013

(54) DEVICE FOR SYSTEM DIAGNOSIS

(75) Inventors: Stephanie Gaudan, Toulouse (FR); Francois Fournier, Roques/sur/Garonne (FR); Christian Sannino, Toulouse (FR); Laurent Robert, Castelnaudary (FR)

(73) Assignee: Thales, Neuilly sur Seine (FR)

( * ) Notice: Subject to any disclaimer, the term of this patent is extended or adjusted under 35 U.S.C. 154(b) by 301 days.

(21) Appl. No.: 12/855,887

(22) Filed: Aug. 13, 2010

(65) Prior Publication Data
US 2011/0040441 A1    Feb. 17, 2011

(30) Foreign Application Priority Data
Aug. 14, 2009    (FR) ...................................... 09 03981

(51) Int. Cl.
*G01M 17/00*    (2006.01)
*G21C 17/00*    (2006.01)

(52) U.S. Cl.
USPC ........................................... 701/14; 701/29.1

(58) Field of Classification Search
USPC .............. 701/3, 8, 9, 14, 24, 29.1, 29.2, 29.4, 701/29.9, 30, 34.4; 702/183, 184; 714/26, 714/30, 40
See application file for complete search history.

(56) References Cited

U.S. PATENT DOCUMENTS

| | | | |
|---|---|---|---|
| 7,362,699 B1 | 4/2008 | Bernas et al. | |
| 2001/0029613 A1* | 10/2001 | Fernandez et al. | 725/105 |
| 2006/0155425 A1 | 7/2006 | Howlett et al. | |
| 2008/0147740 A1 | 6/2008 | Bailly et al. | |
| 2008/0215194 A1 | 9/2008 | Bailly et al. | |
| 2008/0269982 A1 | 10/2008 | Bailly et al. | |
| 2008/0304417 A1 | 12/2008 | Liu et al. | |
| 2008/0304418 A1 | 12/2008 | Fournier et al. | |
| 2008/0312783 A1 | 12/2008 | Mansouri et al. | |
| 2009/0210104 A1 | 8/2009 | Bernard et al. | |
| 2009/0292951 A1 | 11/2009 | Fournier et al. | |

(Continued)

FOREIGN PATENT DOCUMENTS

| | | |
|---|---|---|
| EP | 1 426 870 | 6/2004 |
| FR | 2 917 200 | 12/2008 |
| FR | 2 927 435 | 8/2009 |

OTHER PUBLICATIONS

A.B. Rauzy, et al., "Assessment of Large Automatically Generated Fault Trees by Means of Binary Decision Diagrams," Institution of Mechanical Engineers, Part O: Journal of Risk and Reliability, Jun. 1, 2007, pp. 95-105, vol. 221, No. 2, Professional Engineering Publishing Ltd, UK.

(Continued)

*Primary Examiner* — Mary Cheung
(74) *Attorney, Agent, or Firm* — Baker & Hostetler, LLP

(57) ABSTRACT

The invention relates to a device for system diagnosis of an aircraft. The device includes: means for the monitoring of equipment of the system, the means for emitting messages of observations on the basis of effects produced by equipment; means for the determination of a set of observations on the basis of the messages of observations arising from the monitoring of a log of the messages of observations and of a model representing a current state of the system; means for the determination of indictments on the basis of observations of the set of observations and of a behavioral model of the system, the indictments being logical relations between operating modes of equipment having produced effects; and means for the determination of maintenance operations on the basis of the indictments.

12 Claims, 11 Drawing Sheets

U.S. PATENT DOCUMENTS

| | | |
|---|---|---|
| 2009/0306838 A1 | 12/2009 | Fournier et al. |
| 2010/0010708 A1 | 1/2010 | Bailly et al. |
| 2010/0125379 A1 | 5/2010 | Fournier et al. |
| 2011/0004369 A1 | 1/2011 | Fournier et al. |

OTHER PUBLICATIONS

Sampath Srinivas, "Modeling Techniques and Algorithms for Probabilistic Model-Based Diagnosis and Repair," PhD dissertation Stanford University, Internet Citation: http://portal.acm.org/citation.cfm?id=892578&dl=ACM&coll=GUIDE>, Jul. 1, 1995, pp. 1-113.

Andre Arnold, et al., "The AltaRica Formalism for Describing Concurrent Systems," Fundamenta Informaticae, 2000, pp. 109-124, vols. 34, IOS Press (corresponds to "The AltaRica Language" article cited in specificaton).

Randal E. Bryant, "Graph-Based Algorithms for Boolean Function Manipulation," IEEE Transactions on Computers, Aug. 1986, pp. 1-28, vol. 35, No. 8.

G. Point, et al., "Le Langage AltaRica," Balkema Publishers, Proceedings of the International Conference on Safety and Reliability, ESREL'98, Jun. 20-24, 1998, pp. 119-125. (No English translation available; corresponds to "The AltaRica Article" cited in the specification, which corresponds to the Arnold, et. al article cited in the IDS filed Aug. 13, 2010).

* cited by examiner

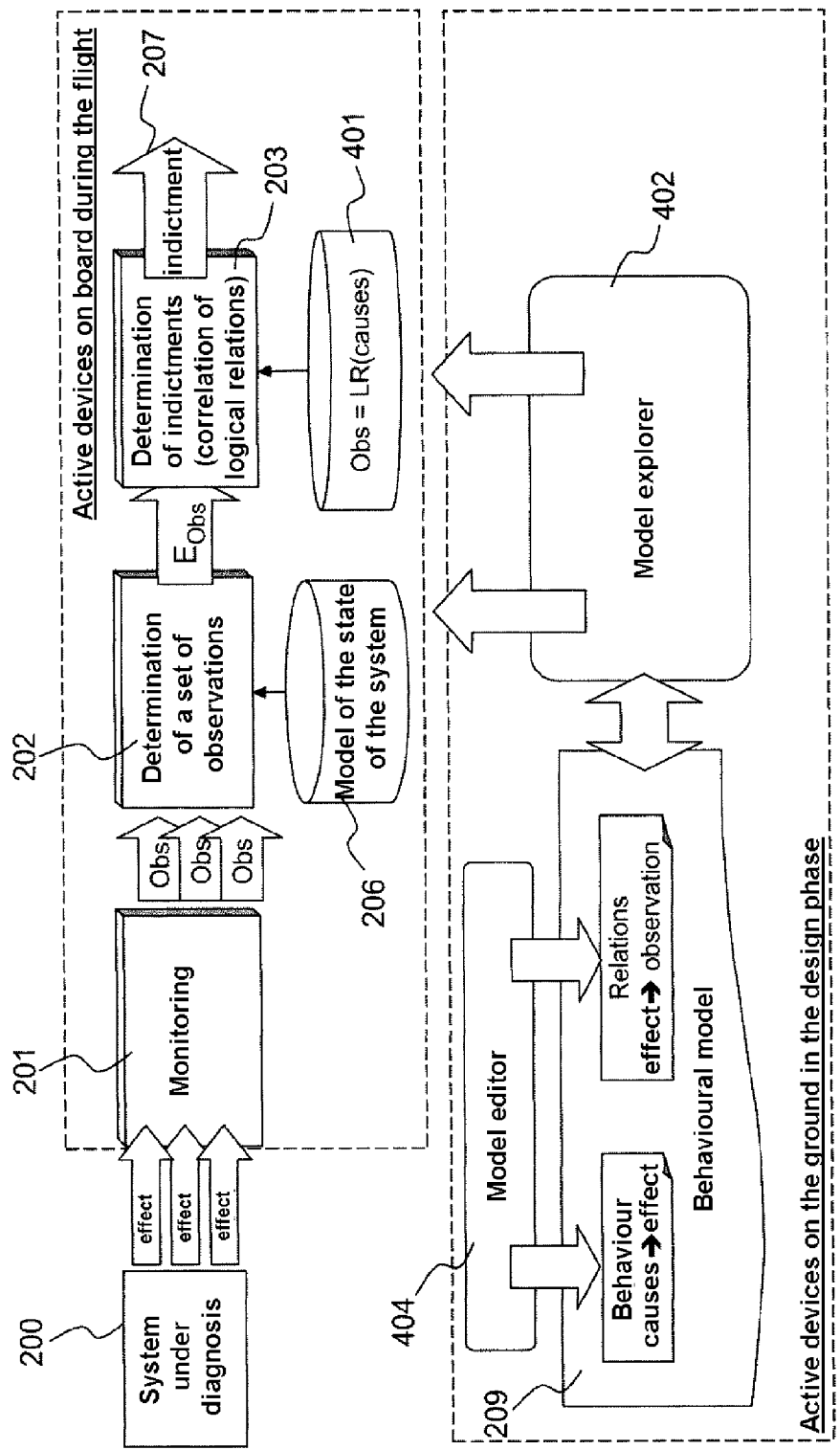
FIG.4.1

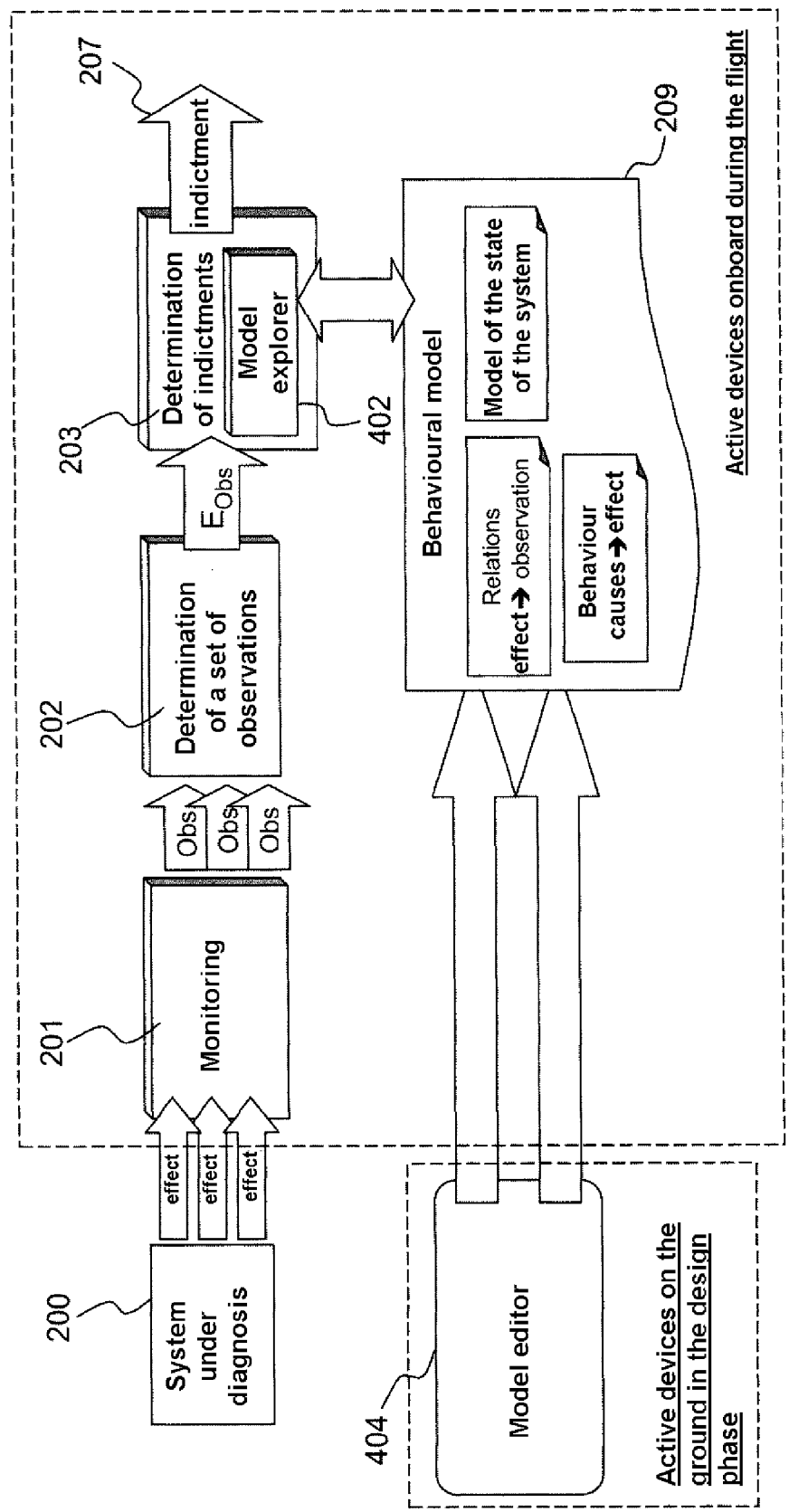
FIG.4.2

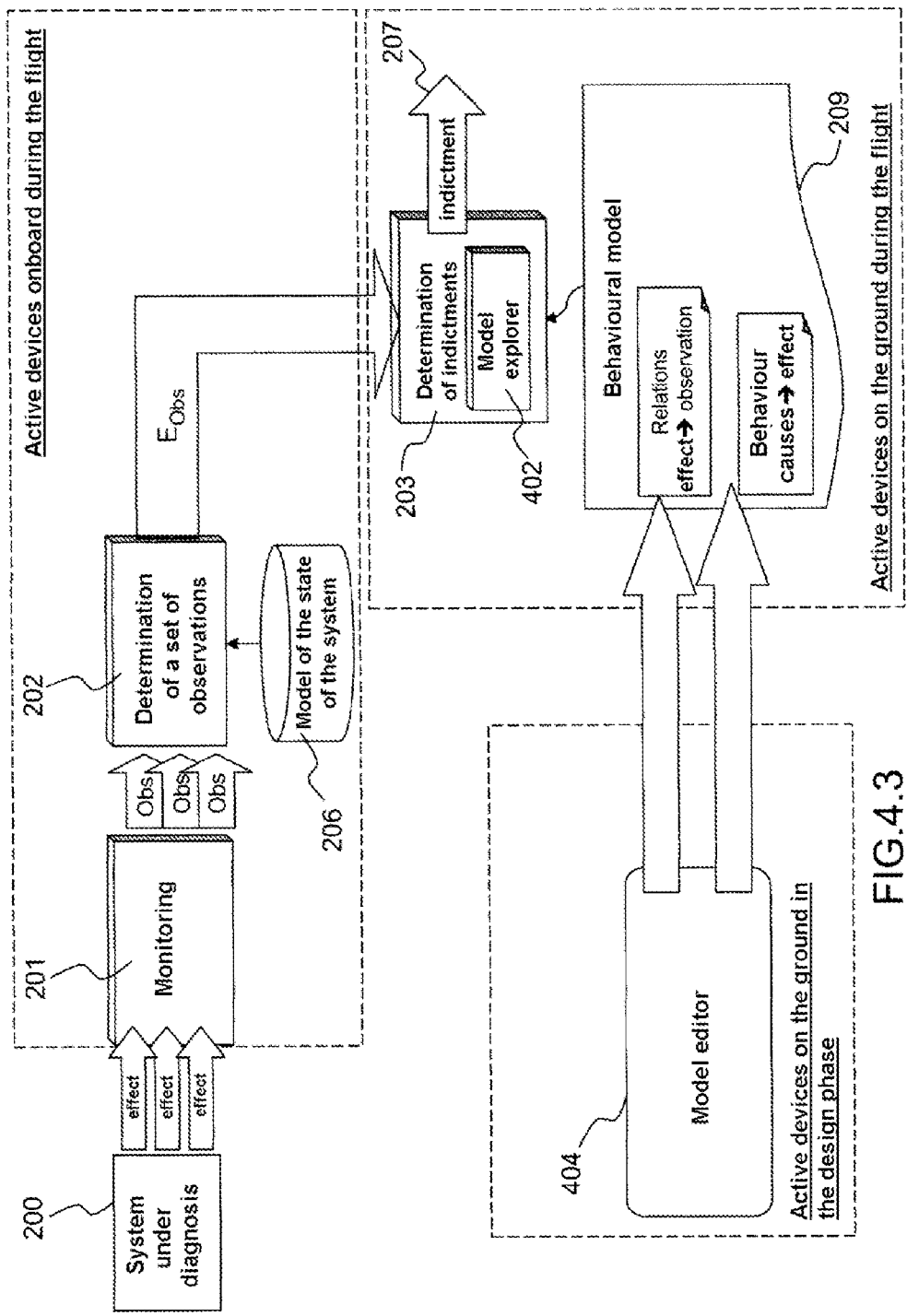
FIG.4.3

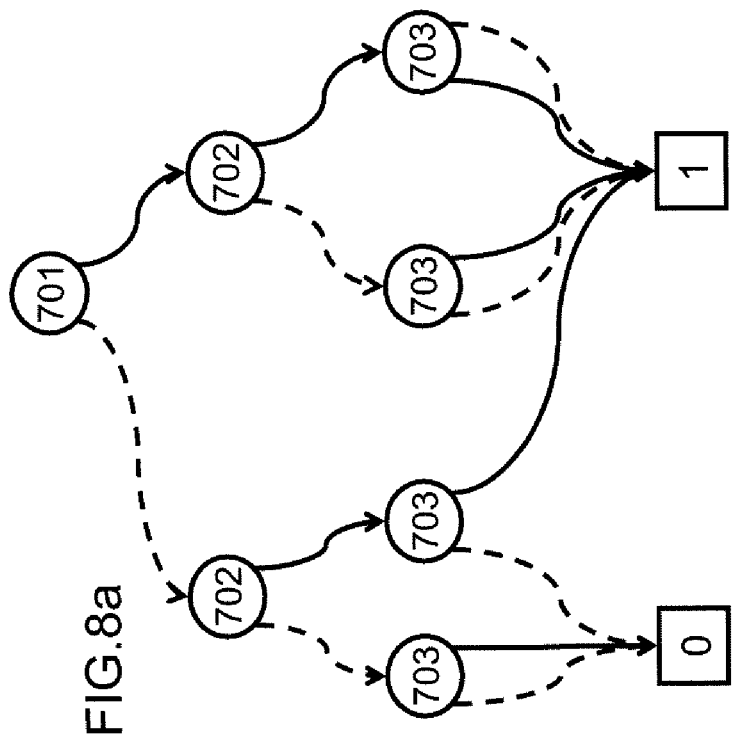
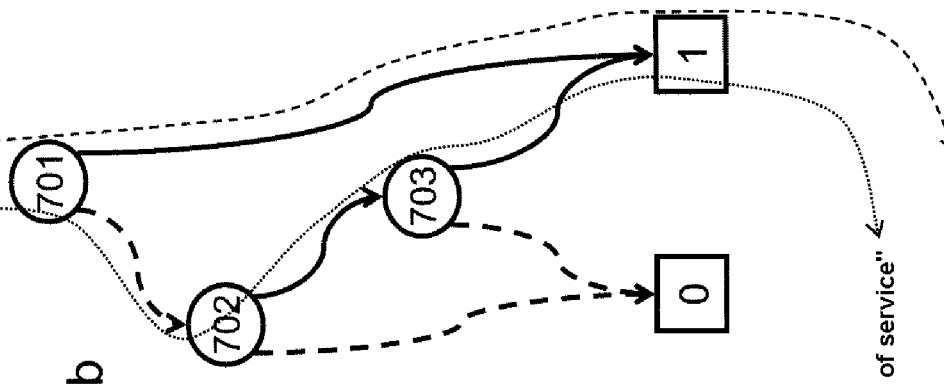
FIG.8a
FIG.8b
Second alternative to the satisfiability condition: "702 and 703 out of service"
First alternative to the satisfiability condition: "701 out of service"

DEVICE FOR SYSTEM DIAGNOSIS

CROSS-REFERENCE TO RELATED APPLICATION

This application claims priority to foreign French patent application No. FR 09 03981, filed on Aug. 14, 2009, the disclosure of which is incorporated by reference in its entirety.

FIELD OF THE INVENTION

The invention relates to the maintenance of a system of an aircraft composed of one or more items of equipment, such that this system fulfils various functions necessary for the accomplishment of a flight.

BACKGROUND OF THE INVENTION

The components of this system communicate with one another and with the exterior environment by way of a physical network. The set of equipment, including the network, constitutes a system called the system under diagnosis.

To improve the degree of confidence accorded to these items of equipment and to ensure their maintenance, monitoring of their proper operation is undertaken, as often as possible, for each of them, consisting in providing them with internal, hardware and/or software mechanisms for detecting anomalies known by the name "monitoring".

The main function of such monitoring is to contribute to flight safety by frequently testing the availability of the equipment, that is to say the normality of their behaviours, while their auxiliary function is to contribute to the maintenance of the system under diagnosis by facilitating the locating of faults in the equipment.

In its main flight safety function, a monitoring is in charge of detecting a possible sudden unavailability of the monitored item of equipment so that the pilot can be warned of this situation.

In its auxiliary function of aiding maintenance, a function known by the initials "BITE", derived from the expression "Built In Test Equipment", a monitoring is in charge of providing, each time that it has brought about an alarm of non-availability during execution of its main flight safety function, a more or less detailed report of the operating state intended to augment a post-flight report termed PFR or LLR standing for "Post Flight Report" or "Last Leg Report" made for the benefit of the ground maintenance personnel.

The system under diagnosis is changeable; various events may modify its make-up: the insertion of new equipment into the network, equipment faults, reconfiguration of the network or selective passivation (that is to say the fact of no longer using part of the equipment). The locating of faults in the system under diagnosis is entrusted to a maintenance device.

The maintenance devices according to the known art are not suitable for taking these changes into account. The problem of taking changes into account is solved by maintenance systems in the form of automatons configured on the basis of a model established during the phase of development of the system under diagnosis. The drawback of these maintenance systems is that they require regular updating to take into account modifications of configurations or of the general state of the aeroplane. A diagnosis device for a system, a flowchart of which is presented in FIG. 1, is known, for example, from the document "Modeling techniques and algorithms for probabilistic model-based diagnosis and repair", (Sampath Srinivas. Knowledge Systems Laboratory, Computer Science Department, Stanford University, Portland, 1995). This device comprises means for the observation 101 of a system under diagnosis 100, means for fault diagnosis 102 consisting in computing probabilities of failure for the elements of the system and means for the determination 103 of maintenance operations to be performed so as to repair the fault.

The maintenance devices according to the known art present another major drawback, which is the poor management of the quantity of information arising from the monitorings, on account of the use of empirical correlation rules. Faced with a large amount of more or less relevant information, current devices turn out to be inadequate and non-optimized.

The invention is aimed notably at alleviating the two problems cited above by proposing an improved maintenance system taking into account in a dynamic manner the changes of the system under diagnosis and automatically correlating the various known information.

For this purpose, the subject of the invention is a device for system diagnosis of an aircraft comprising equipment, the said device comprising:
  means for the monitoring of the equipment, the said means emitting messages of observations on the basis of effects produced by equipment of the system, the said device being characterized in that it furthermore comprises:
  means for the determination of a set of observations on the basis of the messages of observations arising from the means for monitoring, of a log of the messages of observations and of a model representing a current state of the system, the said means for the determination of a set of observations implementing temporal logic,
  means for the determination of indictments on the basis of observations of the set of observations and of a behavioural model of the system, the indictments being logical relations between operating modes of equipment having produced effects,
  means for the determination of maintenance operations on the basis of the indictments.

The device according to the invention implements a model, termed a mirror model, which is updated with each modification of the system under diagnosis and which thus faithfully reflects the system under diagnosis. Such a model can also represent the causal relations (i.e. relations of causes to effects) of the system under diagnosis. It will then be possible for this model to be easily devised during the design of the system under diagnosis by using data arising from operational dependability analysis (FMEA Failure Mode Effect Analysis) and the design more generally. The use of a mirror model arising from the FMEA comprises a first advantage of an economic nature in so far as it makes it possible not to have to develop a specific model used solely for diagnosis.

The device according to the invention implements binary decision diagrams with the advantage of representing sets of combinations of variables of a function, in an extremely complete and concise manner. Less memory room is occupied relative to truth tables customarily used. Furthermore, the processing times for the functions represented in the form of a binary decision diagram are generally faster.

The device furthermore comprises an original architecture which makes it possible to successively process the temporal aspect, the causal aspect and the probabilistic aspect of the fault location problem. The temporal aspect consists in managing the chronology of the messages emitted by the various components of the system under diagnosis. The causal aspect consists in establishing a link between the messages and equipment or components from which these messages are liable to originate. Finally the probabilistic aspect makes it possible to determine the equipment to be suspected by priority.

BRIEF DESCRIPTION OF THE DRAWINGS

The invention will be better understood and other advantages will become apparent on reading the detailed description given by way of nonlimiting example and with the aid of the figures among which:

FIGS. 4.1, 4.2 and 4.3 represent various alternative embodiments of the device for diagnosis according to the invention.

FIG. 8 represents an example of a binary decision diagram under two different representations.

DETAILED DESCRIPTION

Figure 1:
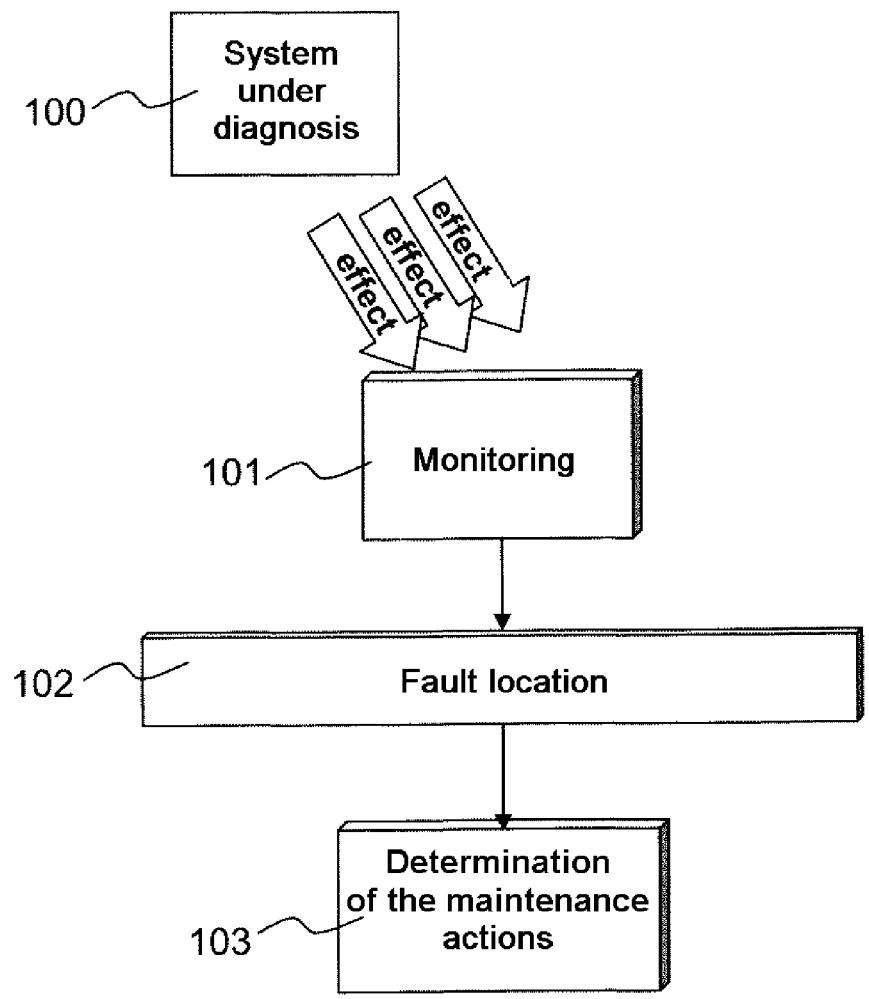
FIG. 1, already presented, represents an example of a diagnosis device according to the known art.
Figure 2:
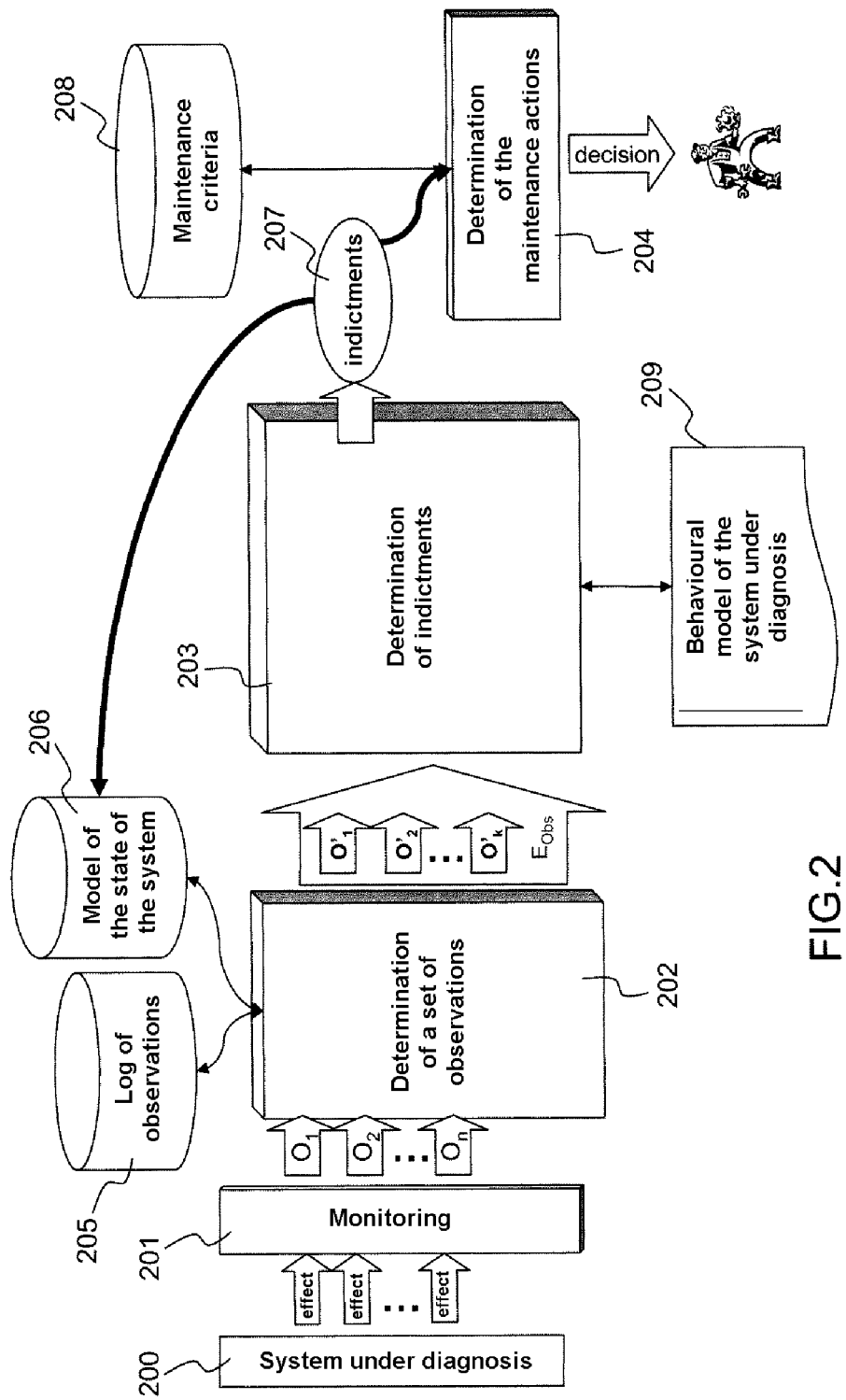
FIG. 2 represents an example of a diagnosis device according to the invention.

FIG. 2 represents an example of the diagnosis device according to the invention. The diagnosis device for a system 200 comprises means 201 for the monitoring of the equipment, the said means emitting messages of observations $O_1$, $O_2, \ldots, O_n$ on the basis of effects originating from the system 200, means 202 for the determination of a set of observations $E_{obs}$ on the basis of the messages of observations $O_1$, $O_2, \ldots, O_n$ arising from the means for monitoring 201, of a log 205 of the messages of observations $O_1, O_2, \ldots, O_n$ and of the model of the system 206, means 203 for the determination of indictments 207 on the basis of observations $O'_1$, $O'_2, \ldots, O'_k$ of the set of observations $E_{obs}$ and of a behavioural model 209 and finally means 204 for the determination of maintenance operations on the basis of the indictments 207.

The model of the system 206 contains the current state of the system 200.

The behavioural model 209 contains the description of the effects produced by the various modes of malfunction (failures, unavailabilities, etc.) of the components of the system 200, as well as observations produced by the means for monitoring 201.

The means for monitoring are identical to the means for monitoring according to the known art. These means are for example implemented by physical sensors or else BITE-type software functions of the equipment.

The observations used can denote information regarding proper operation or improper operation. The presence or the absence of a message is therefore interpreted differently depending on the type of operation observed. Indeed, during nominal operation, certain messages are present and others absent. For example, an item of equipment can signal its proper operation by a periodic "healthy" message, and it can also signal a malfunction when it has detected it by a "fault_XX" message. The absence of a "healthy" message is therefore interpreted differently from the absence of a "fault_XX" message.

The filtering mechanisms according to the known art are limited to simple confirmation. For example, an observation may be transmitted by the monitoring function for an item of equipment if said observation is noted over several observation cycles. For example, if an item of equipment emits a "healthy" message every 15 seconds to an observer, this observer can wait to note this absence of a "healthy" message several successive cycles of 15 seconds before confirming it by a message of the "equipment lost" type. The means 202 for the determination of a set of observations Eobs according to the invention use a log 205 of the observations. The log 205 of the observations is stored in a memory. This log 205 comprises for example the various monitoring messages received which are dated.

The presence or absence of a message is translated into a state of observation in the model 206 of the current state of the system. The means for the updating of the model 206 of the current state of the system comprise an updating of the state of the observations which implements a filtering of these observations. For example, it will be possible to update the states of observations corresponding to information received in one and the same time interval, while ignoring messages received far upstream so as to improve the quality of the diagnosis. The temporal filter is an example of the possible filters for isolating the relevant information for a diagnosis. The temporal filtering can also consist in recognizing an already observed and processed event, which therefore affords no new information. For example, the presence or absence of a "fault_XX" message is represented by a Boolean in the model. By default, on initialization of the model 206, the Boolean "fault_XX" is set to false to represent its absence. If the "fault_XX" message is emitted by the system at a given instant, it will be used by the means 202 for the determination of a set of observations Eobs so that the Boolean variable of the model "fault_XX" is modified to take the value true.

The device according to the invention comprises means 203 for the determination of indictments 207 on the basis of observations $O'1, O'2, \ldots, O'k$ of the set of observations Eobs, the indictments 207 being logical relations between operating modes of equipment (defective, unavailable, etc.) having produced effects at the input of the means for monitoring 201 and being represented in the form of logical relations LR1, LR2, . . . LRk. These means implement the search for the causes that may have led to the set of observations constituted by the present situation. These means use a behavioural model 209 of the system to be diagnosed. The behavioural model 209 of the system under diagnosis corresponds to a description of the behaviour of the propagation of the failures. The use of such a model 209 and of its dynamic updating is described in the patent published under the reference FR2917200.

Another way of embodying the means 203 for the determination of indictments 207 consists in deducing a list of indictments by means of operations for merging several logical relations based on the rules of Boole algebra and the knowledge of the "healthy" states, known or not, of the constituents of the logic equations.

It is recalled that such a model 209 comprises components corresponding to equipment of the system under diagnosis. According to a characteristic of the invention, each component comprises at least: an input stream, an output stream, a state indicating the availability of the item of equipment and comprising: a fault mode, indicating whether the component is defective or healthy and an operating mode indicating whether the component is turned on, turned off or unavailable, and a logical relation between the input stream, the output stream and the state on the one hand, and the output stream on the other hand.

Figure 3:
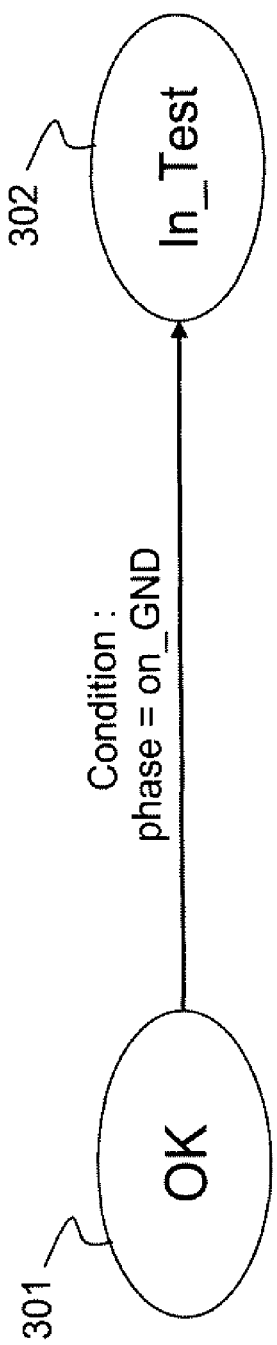
FIG. 3 represents an exemplary constraint-based automaton.

According to a characteristic of the invention, the function defining the behaviour of the component is carried out with a constraint-based automaton. FIG. 3 represents an exemplary constraints-based automaton. Such an automaton comprises states 301,302 and transitions between the states. A constraints-based automaton is an automaton for which the change of state (transition) may be conditioned by logical constraints. For example, if an item of equipment can be in test mode only when the aeroplane is on the ground, the passage from the conventional "nominal" state 301 of the item of equipment to an "under test" state 302 will be possible only when the variable representing the aeroplane flight phase is "on_ground".

A constraint-based automaton may be described for example in the Altarica language. Information on the language can be found on the Internet site http://altarica.labri.u-bordeaux.fr and for example in the article: Alain Griffault, Sylvain Lajeunesse, Gérald Point, Antoine Rauzy, Jean Pierre Signoret, and Philippe Thomas. The AltaRica language. In Balkema Publishers, Proceedings of the International Conference on Safety and Reliability, ESREL '98, Jun. 20-24, 1998.

The AltaRica language is a language for modelling systems for carrying out studies of system operational dependability. The components are connected together by links connecting output streams of one component to the input streams of other components. The concept of stream thus makes it possible to manifest within the model the interactions and the dependencies between the components, thus modelling the way in which the failures and the observations propagate in the system under diagnosis.

The behavioural model 209 reproduces the structure of the system under diagnosis in a hierarchical manner: a component may be decomposed into a set of interconnected components. This characteristic is significant in regard to the hierarchized and centralized examples described further on.

The input streams are used to represent for example an electrical power supply, numerical data or a ventilation stream.

The output streams are used to represent the data emitted by a component. They represent the functional data but also the data serving for diagnosis (when the component creates maintenance messages based on what it observes).

The state of a component represents the general configuration of the corresponding item of equipment. It is characterized by one or more values. One value represents the state of integrity of the component (Intact, degraded type A, degraded type B, Out of Service), while another can represent the operating mode (On, Off, Under Test, etc).

The input streams, the output streams and the state of the components are represented by Boolean variables. The functions defining the behaviour of the components are propositional formulae combining these Boolean variables with the aid of AND and OR logical operators. Thus, in the diagnosis, the events are explanations (causes) of the diagnosis.

Figure 7:
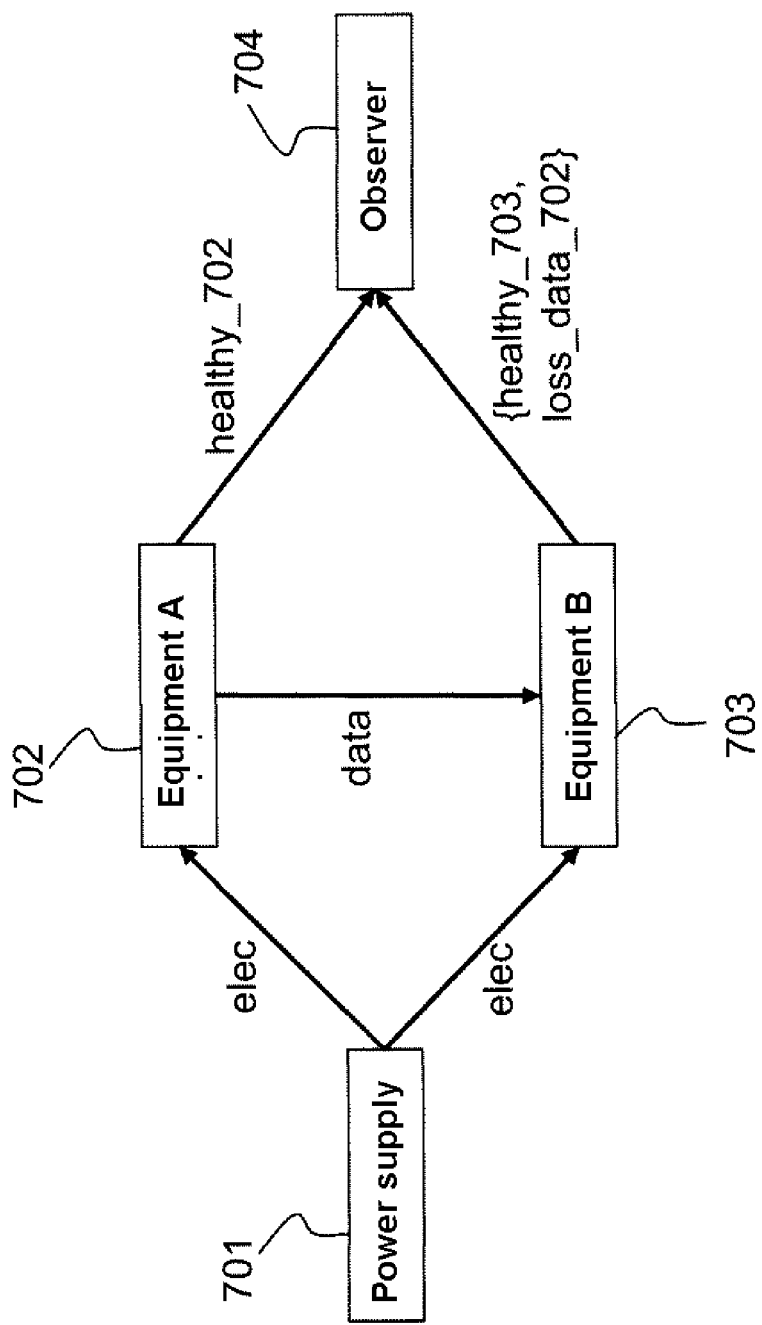
FIG. 7 represents an example of a model of an item of equipment under diagnosis.

FIG. 7 represents an example of a model of a system under diagnosis. The model comprises four components. A first component 701 corresponds to an electrical power supply. The first component 701 comprises two output streams to a second 702 and a third 703 component. These streams represent the electrical power supply stream "elec". The component 702 comprises an output stream to the component 703 representing a dispatched datum "data". Finally, the components 702 and 703 comprise an output stream to a fourth observation component, representing messages used for diagnosis. The component 702 dispatches a message "healthy_702" denoting its proper operation. The component 703 dispatches a message "healthy_703" denoting its proper operation, and dispatches a message "loss_data_702", making it possible to signal the loss, detected by the component 703, of data emitted by the component 702. So that the example remains simple, let us consider that each of the streams (elec, data, healthy_702, healthy_703 and loss_data_702) is represented by a Boolean variable. A stream is absent (absence of electrical power supply, absence of data, absence of message healthy or loss) present (the power supply is provided, the datum is provided, the maintenance messages are present).

In the same manner, in this example, the automatons representing the behaviour of the equipment 701, 702, 703 are simple: they comprise two states: Intact or OutofService.

The logical relations describing the behaviour of the system under diagnosis are the following:
 elec.present=701.intact.
When the component 701 is intact (represented by the variable 701.intact), the elec streams are present.
 healthy_702.present=702.intact AND elec.present
When the component 702 is intact, the datum data is present, and the message healthy_702 is present.
 healthy_703.present=703.intactAND elec.present
 loss_data_703.present=data.absent AND healthy_703.present
When the component 703 is intact, the message healthy_703 is present, and the message loss_data_703 is present only if the stream data received from the component 702 is absent.

When one of the components 701, 702 or 703 is OutofService, all its output streams are absent. This is formalized by an assertion associated with each output stream making it possible to define its value as a function of the input streams and of the state of the component. We will have for example:
assert
702.healthy=if (702.elec=present and 702=intact) present, else absent
703.healthy=if (702.elec=present and 703=intact) present, else absent
703.loss_data_302=if (elec=present and 702=intact and data=absent) present, else absent Another representation of the logical relations is that termed "Binary Decision Diagram" (BDD) such as described, among other publications, by Randal Bryant in IEEE Transactions on Computers, C-35-8, pp. 677-691, August, 1986 [Bryant86].

It is recalled that a binary decision diagram consists of nodes and terminal leaves connected together by branches, each node representing a Boolean variable indicating the presence or the absence of an event, from which two branches sprout, a branch being termed "terminal" if it ends at a terminal leaf of value "0" or "1", or being termed "intermediate" if it ends at another node, a first branch representing the case where the event represented is absent ("0" branch), and a second branch representing the case where the event represented is present ("1" branch), the diagram comprising a single root node from which two branches, to which nodes or leaves are connected in cascade, sprout.

By traversing the diagram from the root to a terminal leaf of value 1, a combination of variables is determined, for which combination the function equals 1, that is to say a combination (a product) of variables causing the appearance of the reference event represented is reconstructed. Consequently, by performing each of the traversals from the root up to each of the terminal leaves of value 1, each of the combinations of variables causing the appearance of the reference event is determined.

The representation of a function in the form of a binary decision diagram therefore makes it possible to represent the set of combinations of variables of a Boolean function in an extremely complete and concise manner. The memory room occupied by such a representation is less than a truth table commonly used according to the prior art. Moreover, the processing times for the functions represented in the form of a binary decision diagram are lower.

According to a first alternative embodiment, the indictment determination 207 is the result of an exploration of the behavioural model 209 of "sequence generation" type via a model explorer.

A global configuration of the model 209 is defined by the set of values fixed for each component of the model.

The principle of generating sequences consists first of all in creating an automaton for which each state represents a global configuration of the model 209, and then in identifying from a state associated with the set of observations (Eobs) the sequences of transitions making it possible to get there (an example of this type of algorithm is gen-seq from Arboost technologies). Each transition corresponds to the occurrence of an event. Details regarding the generation of diagrams can be found in the article "Assessment of Large Automatically Generated Fault Trees by means of Binary Decision Diagrams", J. Gauthier, X. Leduc and A. Rauzy, Proceedings of the Institution of Mechanical Engineers, Journal of Risk and Reliability Published by Professional Engineering Publishing ISSN 1748-006X Volume 221, Number 2/2007 Pages 95-105.

According to a second alternative embodiment, the determination of indictments 207 is the result of a conjunction of the logical relations carried out by means of a binary decision diagram and comprising: the determination of a first binary decision diagram BBD1, BBD2, . . . , BBDk for each observation O'1, O'2, . . . , O'k of the set of observations Eobs, the computation of a second binary decision diagram BDD' by a conjunction operation on the first binary decision diagrams BBD1, BBD2, . . . , BBDk and the computation of an indictment binary decision diagram by the development of the second binary decision diagram (BDD').

According to a characteristic of the second alternative embodiment, the development of the second binary decision diagram BDD' is carried out by performing traversals of the second binary decision diagram BDD' from the root up to each of the terminal leaves of value 1, a traversal corresponding to a combination of events having given rise to the set of observations (Eobs).

For example, let us call "Situation 1" the case where the component 704, the observer, does not receive any message (stream healthy_702, healthy_703 and loss_data_702 all absent). In the absence of reception of any message from the second component 702 and the third component 703, the observer 704 is in a non-nominal situation, for which it is liable to trigger a diagnosis. Consequently, as soon as the time for "construction of the situation" is sufficient (taking account of the various message confirmation times and of the various communication times, and generally, of the processing rules for the temporal aspect), the search for a cause may be performed by the means 203 for the determination of indictments 207.

The analysis of the model of the system makes it possible to create the binary decision diagram representing the configurations of the model bringing about the situation 1. The representation of this binary decision diagram relating to situation 1 is found in FIG. 8. The two representations are equivalent: the first (FIG. 8a) is "naive", the second is the reduced form (FIG. 8b), following the principles outlined in [Bryant86].

The paths from the root 701 to the leaf 1 represent the configurations which bring about situation 1. These are the cases:

1. component 701 out of service: absence of power supply, or
2. components 702 and 703 out of service In this example, the indictments 207 determined with the aid of binary decision diagrams take the following form: (701.HS or (702.HS and 703.HS)).

In the case of the same example, the indictments 207 determined according to the first alternative, by exploration of the model and sequence generation, take the following form: (701.HS or (702.HS then 703.HS) or (703.HS then 702.HS)).

It is noted here that the difference from the indictments 207 determined with the aid of binary decision diagrams is that in the case of indictment of several events, an order exists between the indicted events. Further information is available here: 702.HS then 703.HS signifies that 702 and 703 have developed a fault in a determined order.

The device according to the invention furthermore comprises means 204 for the determination of the maintenance actions on the basis of the indictments. These means define the order in which the equipment will be examined and/or replaced by a maintenance operator. This sorting of the maintenance actions is carried out as a function of predefined maintenance criteria 208. The order of the equipment may be established for example as a function of their probability of failure, of their cost of repair, of their repair time or of a combination of these criteria. The device according to the invention comprises display means making it possible to indicate to a maintenance operator which items of equipment must be repaired or exchanged and the order in which these items of equipment must be repaired or exchanged.

On the basis of information associated with the various states of the indictment (theoretical probabilities of the losses of the components 701, 702 and 703, statistics based on operational feedback about the losses of 701, 702, 703, etc.) it is possible to choose one of the indictments as being the most relevant in the current context and to deal with it.

For example, the device according to the invention is parametrized so as to favour a least expensive repair. If it is considered that the repair of the third item of equipment 703 and of the second item of equipment 702 is more expensive than the repair of the first 701 item of equipment then the display means will present an indication according to which the operator must firstly repair the first item of equipment 701 and then the second 702 and the third 703.

According to a first alternative embodiment of the invention, the device for system diagnosis furthermore comprises a model explorer 402 computing logical relations (LR1, LR2, . . . , LRk) associated with the observations (O'1, O'2, . . . O'k) on the basis of the behavioural model 209 of the system, the means 203 for the determination of the indictments (207) comprising means for the conjunction of the logical relations (LR1, LR2, . . . , LRk).

FIG. 4.1 represents a first alternative embodiment of the diagnosis device according to the invention. According to this alternative embodiment of the invention resorting to the logical relations LRi, the determination of the logical relations LR1, LR2, . . . , LRk is carried out on the basis of a storage unit 401 associating a logical relation with each observation. The device comprises a model editor 404 making it possible to generate or to edit the behavioural model on the basis of a description of the system under diagnosis and of the observations.

In this alternative, the logical relations contained in the storage unit 401 are produced on the ground, during the design phase by utilizing the behavioural model 209 of the system under diagnosis using constraint-based automatons. The behavioural model 209 is utilized by virtue of a model explorer 402. The model explorer produces the said logical relations by means of the exploration of the behavioural model 209. Exploration is understood to mean: request and extraction of the information contained in the model.

According to a second alternative embodiment of the invention, the means 203 for the determination of the indictments 207 comprise a model explorer 402 allowing the direct exploration of the behavioural model 209 of the system and the extraction of events in the form of sequences. The means 203 for the determination of indictments 207 are on board the aircraft. The determination of the indictments is performed during the flight.

FIG. 4.2 represents a second alternative embodiment of the diagnosis device according to the invention. According to this alternative, the search for a cause performed by the device 203 is made by dynamic exploration of the model 209 during flight, without involving a storage unit 401 containing the logical relations of the observations. It may be noted that under these conditions, the model 209 being available on board, the latter can carry out the function, offered by the model 206, of gathering the current state, and the model can thus be dispensed with.

According to a third alternative embodiment of the invention, the means 203 for the determination of the indictments 207 comprise a model explorer 402 allowing the direct exploration of the behavioural model 209 of the system and the extraction of events in sequence form. The means 203 for the determination of indictments 207 are situated on the ground. The determination of the indictments 207 is performed during the flight.

FIG. 4.3 represents a third alternative embodiment of the diagnosis device according to the invention. According to this alternative, the set of observations constructed by the dedicated means 202 is dispatched to the ground, and the diagnosis is done by dynamic utilization of the behavioural model 209 on the ground by means of a Cause Finder 203 carrying out the "Model Explorer" function.

The maintenance device according to the invention comprises various computation means that may be implemented on one or more computers. These computers are equipment of the system under diagnosis or dedicated maintenance equipment.

The system under diagnosis is a set of processing units collaborating with one another to provide a service. A processing unit can itself be seen as a system and therefore as a processing unit set. A system can therefore be decomposed in a hierarchical manner by successively considering the sets of processing units making up a system. Thus, a system under diagnosis may be considered according to various hierarchical levels corresponding to the various sets of processing units.

The system under diagnosis comprises a plurality of processing units. It is decomposed into various hierarchical levels grouping together these various processing units, a first hierarchical level being said to be lower than a second level when the first level comprises component processing units of the processing units of the second level.

For example, an aeroplane comprises processing units called LRU equipment, the abbreviation standing for the expression "Line Replaceable Unit". This may involve electronic equipment such as automatic pilot or navigation computers. This equipment consists of processing units termed SRU (for Shop Replaceable Unit) situated at a lower level in the hierarchical decomposition of the aeroplane. These processing units are for example power supplies, processors or input/output interfaces. A first hierarchical level (for example SRU) is said to be lower than a second level (for example LRU) when the first level comprises component processing units of the processing units of the second level.

The device according to the invention may be implemented at any hierarchical level of a system under diagnosis.

Figure 5:
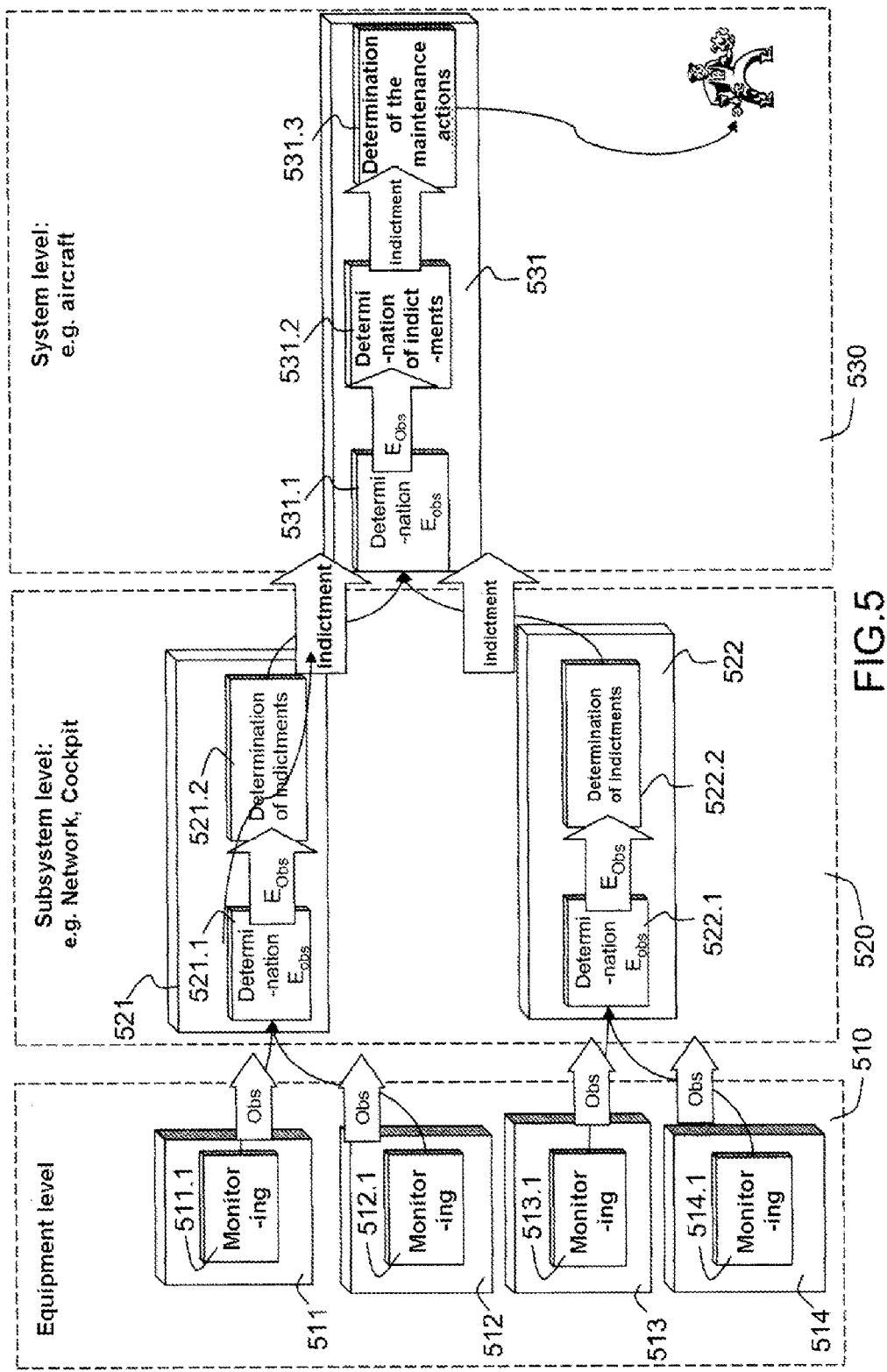
FIG. 5 presents an example of a first embodiment of a diagnosis system according to the invention.

FIG. 5 presents an example of a first embodiment of a diagnosis system according to the invention. This embodiment is said to be hierarchized. In such a maintenance system, the computation means of the device according to the invention are implemented on three different hierarchical levels of the system 200. A first hierarchical level 510 implements means 201 for monitoring. In the example the first hierarchical level 510 is a so-called equipment level. The example comprises four items of equipment 511,512,513,514 each implementing means for monitoring 511.1, 512.1, 513.1, 514.1.

A second level 520, higher than the first level, implements on the one hand means for the determination of a set of observations 202 on the basis of the messages arising from the means 201 for monitoring of the first level and, on the other hand, means for the determination of indictments 203. A processing unit of the second level 520 implements means for the determination of a set of observations 202 with observations arising from the processing units of lower level making it up. In the example, the second level 520 is called the sub-system level. A first processing unit 521 of sub-system level implements means for the determination of a set of observations 521.1 on the basis of the observations provided by a monitoring function 511.1 for a first item of equipment 511 and by a monitoring function 512.1 for a second item of equipment 512. This first processing unit 521 also implements means for the determination of indictments 521.2. A second processing unit 522 of sub-system level implements means for the determination of a set of observations 522.1 on the basis of the observations provided by a monitoring function 513.1 for a third item of equipment 513 and by a monitoring function 514.1 for a fourth item of equipment 514. This second processing unit 522 also implements means for the determination of indictments 522.2.

Finally, a third level 530, higher than the second level 520, implements means for the determination of a set of observations 202 on the basis of the indictments arising from the second level, means for the determination of indictments 203 and means for the determination of the maintenance actions 204. In the example, this level is called the system level. The processing unit implementing the means for the determination of the maintenance actions 204 is for example an aircraft-level maintenance computer.

Figure 6:
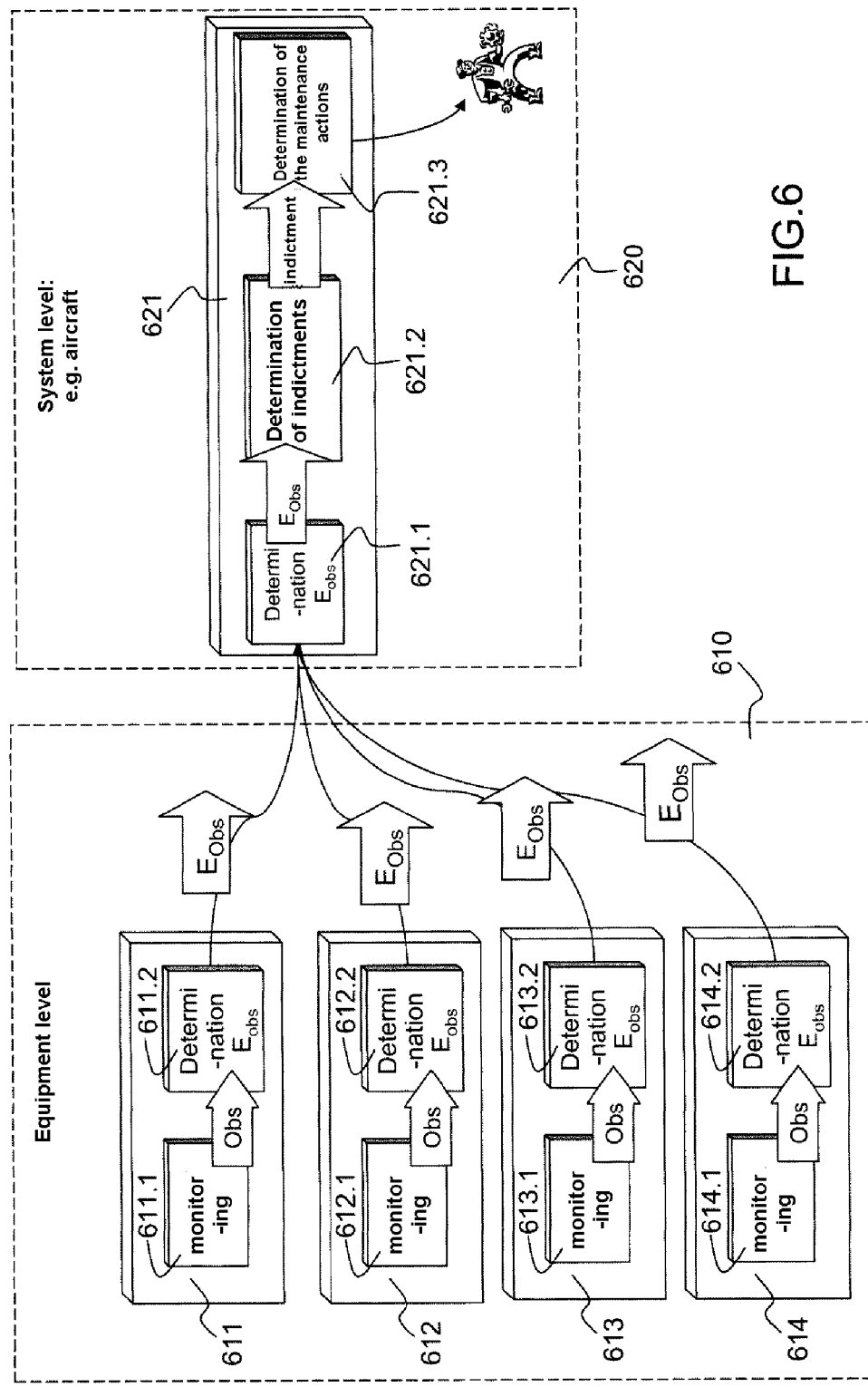
FIG. 6 presents an example of a second embodiment of a diagnosis system according to the invention.

FIG. 6 presents an example of a second embodiment of a device for diagnosis according to the invention. This embodiment is said to be centralized. In such a maintenance system, the computation means of the device according to the invention are implemented on two different hierarchical levels of the system 200.

A first level implements means for monitoring and means for the determination of a set of observations. In the example the first hierarchical level 610 is a so-called equipment level. The example comprises four items of equipment 611, 612, 613, 614 each implementing means for monitoring 611.1, 612.1, 613.1, 614.1 and means for the determination of a set of observations 611.2, 612.2, 613.2, 614.2.

A second level, higher than the first level, implements means for the determination of a set of observations 621.1 on the basis of the sets of observations arising from the first level, means for the determination of indictments 621.2 and means for the determination of the maintenance actions 621.3. These means are implemented on a second hierarchical level 620 higher than the first level 610 and by a single processing unit 621.

Figure 9:
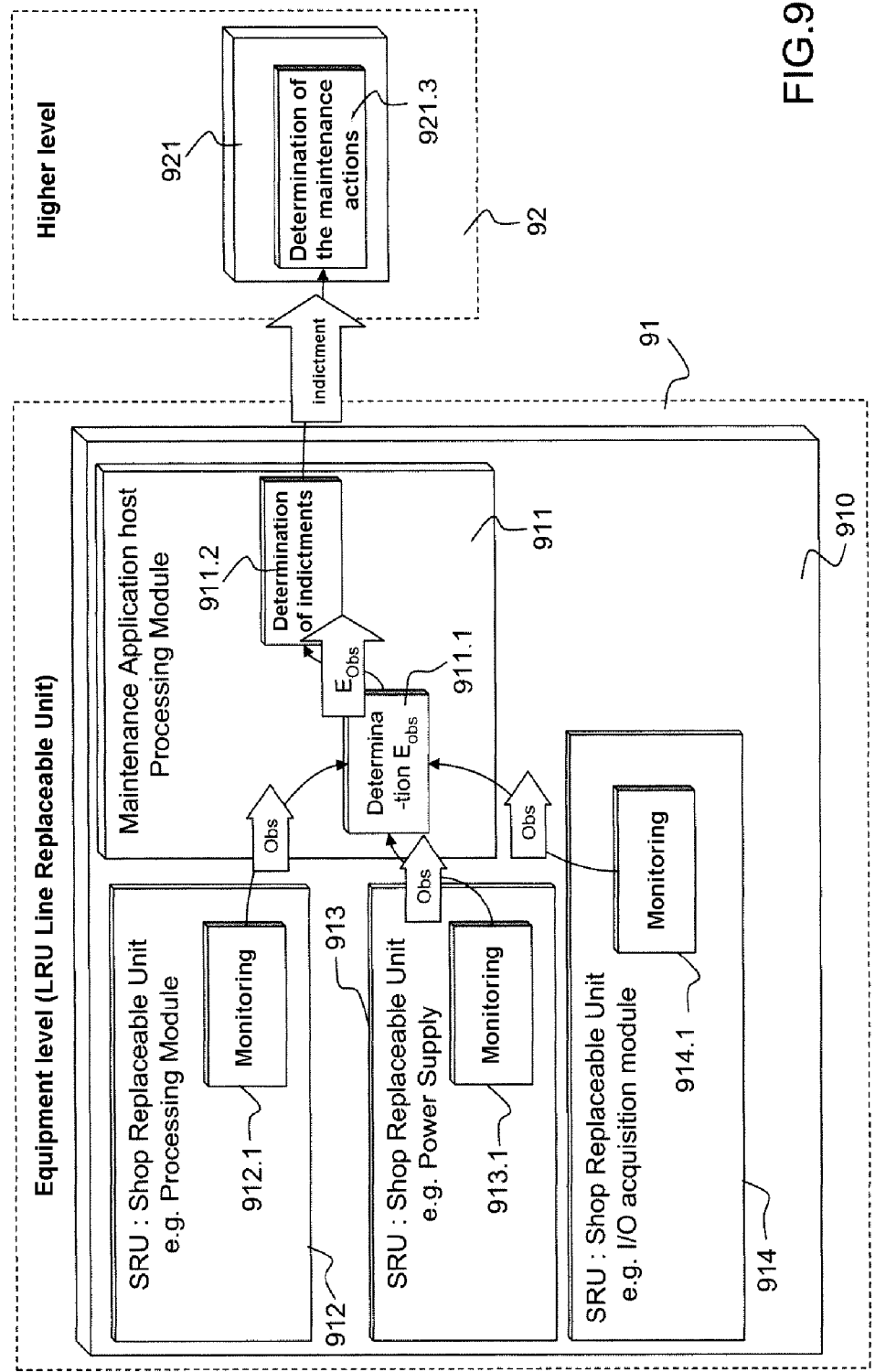
FIG. 9 represents an example of a third embodiment of a diagnosis system according to the invention.

FIG. 9 presents an example of a third embodiment of a diagnosis device according to the invention. This embodiment is an alternative of the so-called Hierarchized mode. In such a maintenance system, the computation means of the device according to the invention are implemented on three hierarchical levels, the first two of which remain inside the item of equipment 91. The first level groups together processing units of Shop Replaceable Unit type corresponding to electronic modules internal to an item of equipment and the second level corresponds to a maintenance application internal to the item of equipment.

A first hierarchical level 91 implements means 201 for monitoring. In the example the first hierarchical level 91 is a level termed SRU (Shop Replaceable Unit) and corresponds to the electronic modules internal to an item of equipment. The example comprises three SRUs 912, 913, 914 each implementing means for monitoring 912.1, 913.1, 914.1.

A second level, still internal to the item of equipment 91, implements on the one hand means for the determination of a set of observations 202 on the basis of the messages arising from the means 201 for monitoring of the first level and, on the other hand, means for the determination of indictments 203. A processing unit of the second level 911 implements means for the determination of a set of observations 202 with observations arising from the processing units of lower level making it up. In the example, the second level 911 is a so-called maintenance application internal to the item of equipment. A processing unit 911 implements means for the determination of a set of observations 911.1 on the basis of the observations provided by a monitoring function 912.1, 913.1, 914.1. This processing unit 911 also implements means for the determination of indictments 911.2.

Finally, a third level 92, higher than the second level 91, implements means for the determination of indictments 203 and means for the determination of the maintenance actions 204. In the example, this level is called the system level. The processing unit implementing the means for the determination of the maintenance actions 921.3 is for example an aircraft-level maintenance computer.

What is claimed is:

1. A device for system diagnosis of an aircraft comprising equipment, said device comprising:
    means for the monitoring of the equipment and means for emitting messages of observations ($O_1, O_2, \ldots, O_n$) on a basis of effects produced by equipment of the system;
    means for the determination of a set of observations ($E_{obs}$) on a basis of the messages of observations ($O_1, O_2, \ldots, O_n$) arising from the means for the monitoring, of a log of the messages of observations ($O_1, O_2, \ldots, O_n$) and of a model representing a current state of the system, said means for the determination of a set of observations ($E_{obs}$) implementing temporal logic;
    means for the determination of indictments on a basis of observations ($O'_1, O'_2, \ldots, O'_k$) of the set of observations ($E_{obs}$) and of a behavioural model of the system, the indictments being logical relations between operating modes of equipment having produced effects;
    means for the determination of maintenance operations on the basis of the indictments; and
    a model explorer for computing logical relations ($LR_1, LR_2, \ldots, LR_k$) associated with the observations ($O'_1, O'_2, \ldots O'_k$) on a basis of the behavioural model of the system, the means for the determination of the indictments comprising means for the con'unction of the logical relations ($LR_1, LR_2, \ldots, LR_k$),
    wherein the con'unction of the logical relations ($LR_1, LR_2, \ldots, LR_k$) is carried out by means of a binary decision diagram and comprises:
    determination of a first binary decision diagram (BBD1, BBD2, \ldots, BBDk) for each observation (O'1, O'2, \ldots, O'k) of the set of observations ($E_{obs}$);
    computation of a second binary decision diagram (BDD') by a conjunction operation on the first binary decision diagrams (BBD1, BBD2, \ldots, BBDk); and
    computation of an indictment binary decision diagram by the development of the second binary decision diagram (BDD').

2. The device for system diagnosis according to claim 1, wherein the means for the determination of the indictments comprises a model explorer allowing the direct exploration of the behavioural model of the system and the extraction of events in the form of sequences.

3. The device for system diagnosis according to claim 2, wherein the means for the determination of indictments is on board the aircraft, the determination of the indictments being performed during flight.

4. The device for system diagnosis according to claim 2, wherein the means for the determination of indictments is situated on the ground, the determination of the indictments being performed during the flight.

5. The device for system diagnosis according to claim 1, wherein a binary decision diagram comprises nodes, from which two branches sprout, and terminal leaves connected together by branches, each node representing a Boolean variable indicating the presence or the absence of an event, a branch being termed a terminal if it ends at a terminal leaf of value 0 or 1, or being termed intermediate if it ends at another node, a first branch representing the case where the event represented is absent, and a second branch representing the case where the event represented is present, the diagram comprising a single root node from which two branches, to which nodes or leaves are connected in cascade, sprout.

6. The device for system diagnosis according to claim 5, wherein the development of the second binary decision diagram (BDD') is carried out by performing traversals of the second binary decision diagram (BDD') from the root up to each of the terminal leaves of value 1, a traversal corresponding to a combination of events having given rise to the set of observations ($E_{obs}$).

7. The device for system diagnosis according to claim 1, wherein the determination of the logical relations ($LR_1, LR_2, \ldots, LR_k$) is carried out on the basis of a storage unit for associating a logical relation with each observation.

8. The device for system diagnosis according to claim 1, wherein the behavioural model comprises a component for each item of equipment of the system, a component of the behavioural model comprising at least:
    an input stream, an output stream, a state indicating the availability of the item of equipment and comprising:
    a fault mode, for indicating whether the component is defective or healthy and an operating mode for indicating whether the component is turned on, turned off or unavailable, and a logical relation between the input stream, the output stream and the state, and the output stream.

9. The device for system diagnosis according to claim 1, wherein the system under diagnosis comprises a plurality of processing units and is decomposed into various hierarchical levels grouping together these various processing units, a first hierarchical level being lower than a second level when the first level comprises component processing units of the processing units of the second level.

10. The device for system diagnosis according to claim 9, wherein the computation means of the device is implemented on two different hierarchical levels of the system comprising:
    a first level implementing means for the monitoring and means for the determination of a set of observations; and
    a second level, higher than the first level, implementing means for the determination of a set of observations on the basis of the sets of observations arising from the first level, means for the determination of indictments and means for the determination of the maintenance actions.

11. The device for system diagnosis according to claim 9, wherein the computation means of the device according to the invention is implemented on three different hierarchical levels of the system comprising:
    a first hierarchical level implementing means for the monitoring;
    a second level, higher than the first level, implementing means for the determination of a set of observations on the basis of the messages arising from the means for the monitoring of the first level and means for the determination of indictments; and
    a third level, higher than the second level, implementing means for the determination of a set of observations on the basis of the indictments arising from the second level, means for the determination of indictments and means for the determination of the maintenance actions.

12. The device for system diagnosis according to claim 11, wherein the first level groups together processing units of Shop Replaceable Unit type corresponding to electronic modules internal to an item of equipment and in that the second level corresponds to a maintenance application internal to the item of equipment.

\* \* \* \* \*